(12) United States Patent
Kumar et al.

(10) Patent No.: US 6,358,625 B1
(45) Date of Patent: Mar. 19, 2002

(54) REFRACTORY METALS WITH IMPROVED ADHESION STRENGTH

(75) Inventors: Prabhat Kumar; Howard V. Goldberg, both of Framingham; Thomas Ryan, Canton, all of MA (US)

(73) Assignee: H. C. Starck, Inc., Newton, MA (US)

( * ) Notice: Subject to any disclaimer, the term of this patent is extended or adjusted under 35 U.S.C. 154(b) by 0 days.

(21) Appl. No.: 09/567,677

(22) Filed: May 9, 2000

Related U.S. Application Data

(60) Provisional application No. 60/158,727, filed on Oct. 11, 1999.

(51) Int. Cl.$^7$ .............................. B22F 7/08; C22B 34/24
(52) U.S. Cl. ...................... 428/553; 428/629; 428/662; 257/741; 257/746; 257/784
(58) Field of Search ................................ 428/553, 629, 428/662, 661; 257/741, 746, 784

(56) References Cited

U.S. PATENT DOCUMENTS

| | | | | |
|---|---|---|---|---|
| 5,171,379 A | * | 12/1992 | Kumar | |
| 5,242,481 A | * | 9/1993 | Kumar | |
| 5,869,196 A | * | 2/1999 | Wong et al. | |
| 6,165,623 A | * | 12/2000 | Fife et al. | |
| 6,193,779 B1 | * | 2/2001 | Reichert et al. | |
| 6,243,255 B1 | * | 6/2001 | Kuge et al. | |
| 6,261,337 B1 | * | 7/2001 | Kumar | |

* cited by examiner

*Primary Examiner*—Deborah Jones
*Assistant Examiner*—Jason Savage
(74) *Attorney, Agent, or Firm*—Perkins, Smith & Cohen, LLP; Jerry Cohen

(57) ABSTRACT

Refractory metal articles having hither than normal impurity levels of concentrations of additive species near the surface that promote chemically enhanced sintering without any adverse effect on function properties, including, among others, tantalum or niobium lead wires that form assemblies useful as electrolytic capacitor anodes and the like, as made by surface oxidation of the wire, embedding a wire end in a loose mass of the powder and sintering to producing assemblies of enhanced structural integrity and affording stable electrical characteristics of electrical devices including such assemblies.

8 Claims, 3 Drawing Sheets

REFRACTORY METALS WITH IMPROVED ADHESION STRENGTH

CROSS REFERENCE TO RELATED APPLICATION

This application claims priority of the U.S. provisional application Ser. No. 60/158,727 filed Oct. 11, 1999 by the applicants herein.

FIELD OF THE INVENTION

The present invention relates to refractory metals and alloys with enhanced adhesion strength and more particularly to enhanced bonding of the lead wire to the anode.

BACKGROUND OF THE INVENTION

Electrolytic capacitors used in computers and telecommunications equipment and like high grade applications industry are made of sintered tantalum and niobium powders, including powders made of alloys of these metals with each other and other metals as alternatives to powders made of one or the other of such elemental metals. The capacitors utilizing such anodes have high capacitance per units of volume and weight of the sintered powder porous compact anodes that constitute the anode of the capacitor. The compacts have fine powder sizes of primary particles and uniformity of sizes and porosity of secondary particles (agglomerates) made from the primary particles. The anodes are also characterized in modern usage by miniaturization of the compact as a whole and use of selected additives to the original powders and/or to the compacts to enhance capacitor performance and/or the manufacturing process regarding one or more of capacitance, sinterability and resistance to electrical leakage and voltage breakdown. Known additives for one or more of such purposes include phosphorous, silicon, carbon, nitrogen and other elements.

These anodes have lead wires of niobium, tantalum and of alloys of these metals with each other and other metals. The anode compacts can have pre-placed lead wires that are embedded in the powder and the compacts with such included wires pass through a sinter furnace with the compacts. Alternatively, the compacts can be sintered and lead wires can be welded to the compacts. The compacts can be of rod like or flat polygonal forms and the wires (or round wire of ribbon form) can be adhered to the compact in good structurally supporting and high electrical current/thermal transfer relation by end or side connections.

It is a principal object of the present invention to increase the adhesion strength of refractory metals and alloys to other refractory metals and alloys, such as the bond strength of the lead wire to the anode compact. Good bonding is important for structural reasons just to reliably maintain the integrity and reliability of the anode-lead assembly of a capacitor and of the high value circuit including such capacitor, under the physical, electrical and thermal stress conditions that can occur in the course of capacitor production or use. Even where a gross rupture of the anode to lead wire bond is not detectable a weak bond can lead to higher leakage and/or increased vulnerability to voltage or frequency induced breakdowns.

The problems of the capacitor art related to lead wire bonding are exacerbated at ever smaller sizes of compacts and of the lead wires enabled by high capacitance per unit volume of modern, improved powders and improved compacts.

SUMMARY OF THE INVENTION

The present invention provides a method to increase the adhesion strength of refractory metals and alloys to other refractory metals and alloys. In one embodiment of the invention, the bonding of lead wire to capacitor anodes is improved. This is accomplished by modifying the lead wire surface by controlled oxidation and control of wire chemistry and physical properties for optimum use of the oxidation. The oxidation can be done to finish wires or to wire precursors such as bar and rod.

The bond strength between two refractory metal bodies can be measured by several standard methods, such as tensile testing, shear testing or torsional testing. In one embodiment of the invention, a tensile test method is used for measuring the bond strength between the wire and the powder anode. Bond strength is measured by embedding the wire in a powder mass, sintering to form a compact and implementing a consistent tension after sintering to determine force required to pull the wire apart from the compact with and without practice of the present invention and in comparing variants of the present invention. Similarly, electrical characteristics are determined by processing the sintered compact-wire assemblies to finished capacitors (of solid or wet electrolyte types) and conducting standard leakage and breakdown tests under similar conditions of electrical cycling and ambient stress for capacitors whose anode compact-lead wire assemblies were made with and without practice of the present invention and also in comparing variants of the present invention.

The oxidation treatment is applied in a way to produce a depth profile of added oxidation that peaks in a distance of 20 to 200 nanometers from the wire surface. Zero to 200 nanometers is suitable and a peak usually occurs in fact at the surface but as a practical matter the peak is rarely seen at the surface by most measuring systems because of presence at a surface of interfering contaminants. The actual peak or apparent peak (both substantially the same) should have an oxygen level about 20–40% higher (on an atomic % basis) compared to bulk oxygen content level of the wire and in any event above 30 atomic % oxygen at the peak. Roll off from the peak should be steep towards the interior of the wire (50%+attenuation of the differential of peak to bulk oxygen level within 100 nanometers of depth). The manners of oxidation treatment are preferably to pass the wire rapidly through a furnace and expose it to a partial atmosphere of oxygen. But the oxidation can be done in other ways including electrolytic oxidation, wet chemical treatment, pack coating, reactive sputtering, temporary coating (or lamination) and diffusion (and subsequent coating removal). The oxidation is normally done after wire production but can be integrated with wire production. The wire itself can be homogeneous or have a core/sheath configuration by coating or co-extrusion or laminating production.

It has been found that the oxidation substantially enhances wire to compact bond strength while having little or no adverse effect on electrical characteristics of the eventual capacitor. It is surprising and counter-intuitive that the electrical characteristics would not be degraded since excess oxygen, particularly at the compact-wire interface and at zones where tantalum or niobium are anodized (formed) to establish a dielectric pentoxide layer, is normally associated with electrical instability.

While the reason for enhanced bonding is not fully understood it is believed that the thin oxidized layer at the surface lowers local melting point and increases vapor pressure in a limited critical zone to enable chemically enhanced sintering. At the same time the limited amount of added oxygen at the peak does not act as a source of excessive oxygen that will migrate to the powder or to the wire bulk with deleterious effects. For example, tantalum capacitor powders can have 1000–20,000 PPM, oxygen (normally at or close to 3,100 in high-grade units) and lead wires can be made with 50–300 PPM, preferably under 200 PPM. A small increase of oxygen at the wire surface as described herein has little or no potential to degrade the powder or wire electrical or physical properties under thermal and electrical stress conditions of sintering, capacitor manufacture or capacitor use. The above described oxygen depth profile of the wire changes, in the course of bonding to the compact as part of sintering the compact with embedded wire or by later welding. But there is little or no further change in the course of pyrolytic decomposition of an electrolyte precursor to form solid electrolyte (typically manganese dioxide) within the compact or in the course of capacitor usage.

The same considerations also apply to appropriate surface additives other than oxygen, e.g. niobium, germanium, silicon, carbon and others in appropriate refractory metal bonding situations. Without limiting the invention by theory of operation, it also appears that the properly selected added species of the refractory metal article surface diffuses to the additional refractory material (e.g. powder of anode) at the surface and that there is a crossing reverse diffusion of atoms of the additional refractory material that accounts for at least a substantial portion of the enhanced sintering (reduction of necessary time and/or temperature) and enhanced bond strength shown above with second order end product benefits (e.g. lower capacitor leakage) shown herein.

Illustrative examples below are devoted to tantalum and niobium wire in electrolytic capacitors, but it should be understood that the invention is applicable to other refractory metals (Ti, Mo, W, V, Zr, Hf) and uses not only in capacitors, but also in batteries, reactor systems, and other devices. The invention can also be applied to bonding of solid articles as well as bonding a solid article to a loose or consolidated powder mass.

Other objects, features and advantages will be apparent from the following detailed description of preferred embodiments taken in conjunction with the accompanying drawings in which:

DETAILED DESCRIPTION OF PREFERRED EMBODIMENTS

The following examples illustrate practice of the invention according to preferred embodiments thereof.

EXAMPLE NO. 1

A tantalum wire of about 0.24 mm diameter was passed through a tube furnace with an oxygen enriched atmosphere at 65 ft./min to oxidize the tantalum wire. The temperature in tube furnace was maintained at 825° C. The wire-powder bond strength was measured by embedding oxidized and non-oxidized (as-produced) wires in cup-contained masses of loose tantalum powder, cold pressing the powders with embedded wires into anodes of 5.5 gm/cc density, sintering the anodes for 20 minutes at 1250° C. and measuring the force required to pull the wire out of sintered anodes. The bond strength increased by about 20%.

| Condition | Bond strength (in pounds) |
| --- | --- |
| As-produced | 4 |
| Oxidized | 4.7 |

EXAMPLE NO. 2

Figure 1:
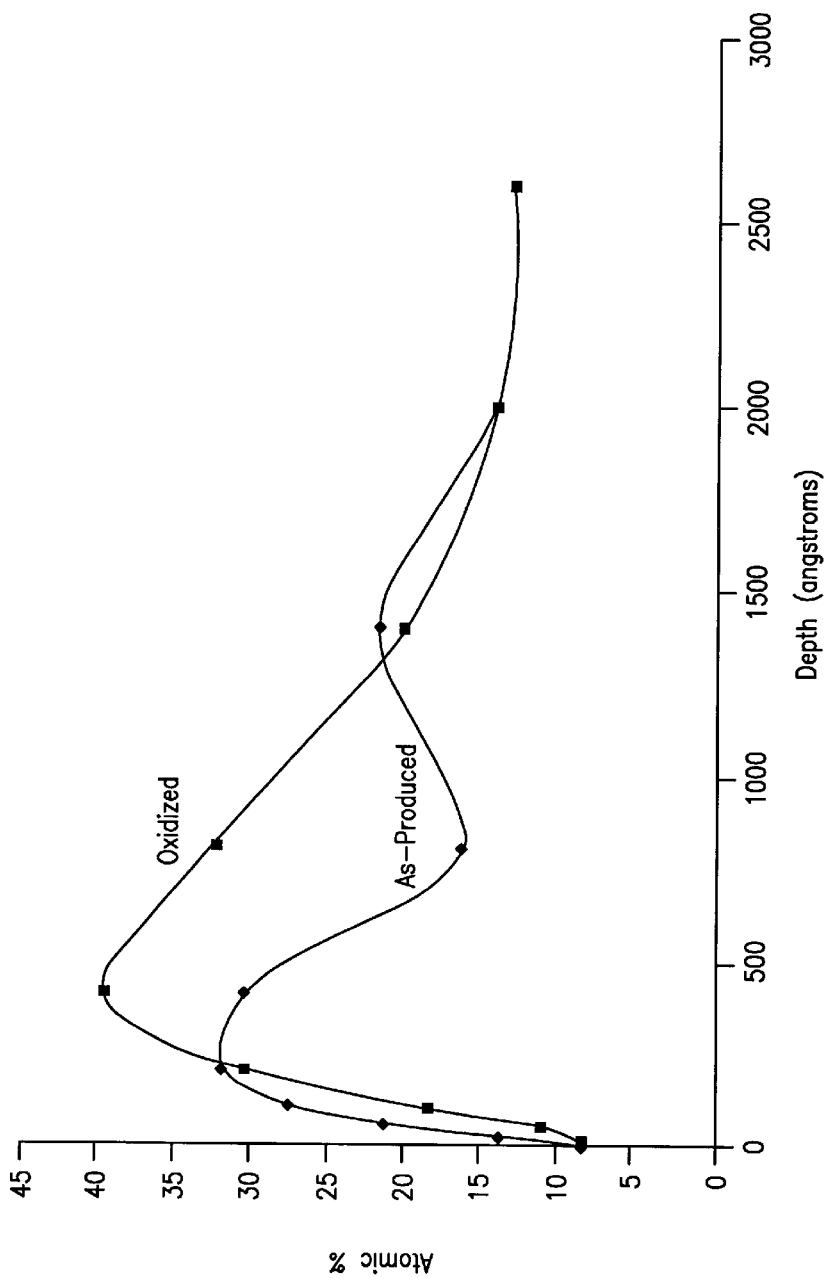
FIGS. 1 and 2 are depth (from wire surface) profiles of oxygen (atomic %) vs. depth from the wire surface in Angstroms (FIG. 1) and nano-meters (FIG. 2) for two embodiments of practice of the invention, described below.

Lead wires of extra-hard tantalum of about 0.24 mm diameter were oxidized as in Example 1. The oxygen concentration profile, as a function of depth from the surface, was measured by Scanning Auger Electron Spectroscopy. The surface of the wire was gradually sputter-etched at a controlled rate and the concentration of Auger electrons was measured to determine the oxygen concentration. The oxidized wire had an oxygen concentration greater than 35 atomic percent up to 500 Angstroms depth (50 nanometers) below the surface. In contrast, the as-produced wire had less than 35 atomic percent oxygen. FIG. 1 illustrates the oxygen profile. The color of the wire was purple-gold.

EXAMPLE NO. 3

Annealed tantalum wire was oxidized as in Example 1. The wire-powder bond strength was measured by embedding the wire into tantalum powder, pressing the powder in to anodes of 5.5 gm/cc density, sintering anodes for 20 minutes at 1250° C. and measuring the force required to pull the wire out of sintered anodes. The bond strength increased by about 40%.

| Condition | Bond strength |
| --- | --- |
| As-produced | 2.3 |
| Oxidized | 3.2 |

EXAMPLE NO. 4

Sample wires of half-hard niobium—1% zirconium alloy were oxidized as in Example 1 but with furnace temperature at 525° C. The wire-powder bond strength was measured by embedding the wire in to niobium powder, pressing the powder into anodes of 3.0 gm/cc density, sintering the anodes for 20 minutes at 1100° C. and measuring the force required to pull the wire out of sintered anodes. The bond strength increased by about 32%.

| Condition | Bond strength |
| --- | --- |
| As-produced | 0.65 |
| Oxidized | 0.95 |

EXAMPLE NO. 5

Example 4 was repeated but with anodes of 3.5 gm/cc density. The bond strength increased by about 35% for oxidized vs. produced wire usage.

| Condition | Bond strength |
| --- | --- |
| As-produced | 2.0 |
| Oxidized | 2.7 |

EXAMPLE NO. 6

Figure 2:
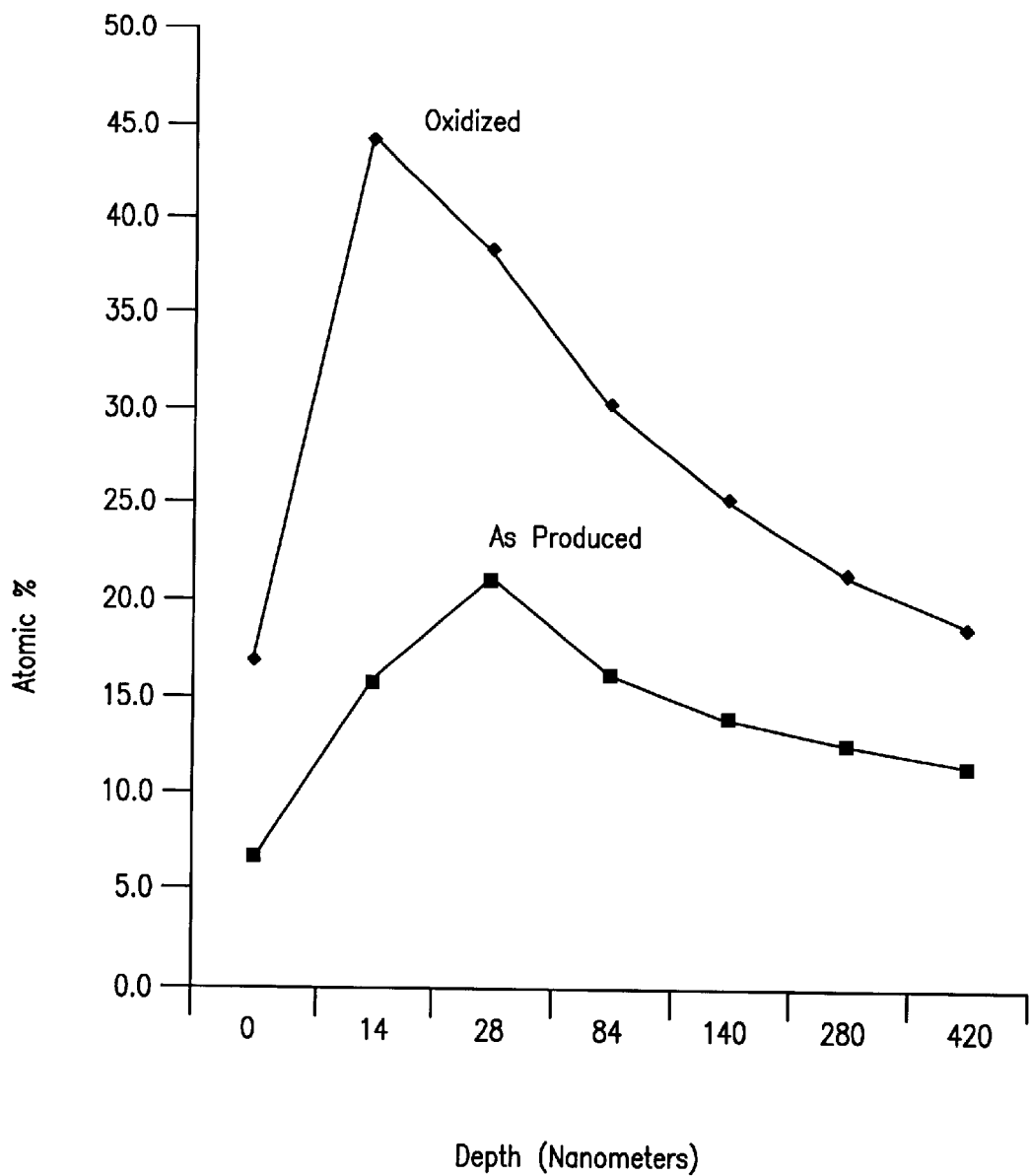

Niobium 1% zirconium alloy wire was prepared as in Example 4. The oxygen concentration profile as a function of depth from the surface was measured by Scanning Auger Electron Spectroscopy. The surface of the wire was gradually sputtered at a controlled rate and the concentration of oxygen-Auger electrons was measured to determine the oxygen concentration. The oxidized wire had an oxygen concentration greater than 25 atomic percent up to 100 nanometers below the surface. In contrast, the as-produced wire had less than 25 atomic percent oxygen. FIG. 2 shows the oxygen profile.

EXAMPLE NO. 7

Extra-hard tantalum wire of about 0.24 mm diameter was coated with niobium by sputtering niobium onto it. The wire-powder bond strength was measured by embedding the wire into tantalum powder, pressing the powder in to anodes of 5.5 gm/cc density, sintering anodes for 20 minutes at 1250° C. and measuring the force required to pull the wire out of sintered anodes. The bond strength increased by about 48%.

| Condition | Bond strength |
| --- | --- |
| As-produced | 3.3 |
| Oxidized | 4.9 |

EXAMPLE NO. 8

Extra-hard tantalum wire of about 0.24-mm diameter wire was non-thermally electro-anodized (electro-oxidized) in 0.1% phosphoric acid solution at 110 volts. The wire-powder bond strength was measured by embedding the wire into tantalum powder, pressing the powder into anodes of 5.5 gm/cc density, sintering anodes for 20 minutes at 1250° C. and measuring the force required to pull the wire out of sintered anodes. The bond strength increased by about (48%).

| Condition | Bond strength |
| --- | --- |
| As-produced | 2.25 |
| Oxidized | 3.33 |

EXAMPLE NO. 9

Tantalum wire of about 0.24-mm diameter was oxidized by passing through a tube furnace at 35 ft./min. The temperature in tube furnace was maintained at 600° C. and its atmosphere was as in Example 1. The wire-powder bond strength was measured by embedding the wire into tantalum powder, pressing the powder into anodes of 5.5 gm/cc density, sintering anodes for 20 minutes at 1250° C. and measuring the force required to pull the wire out of sintered anodes. The bond strength increased by about 25%.

| Condition | Bond strength |
| --- | --- |
| As-produced | 2.4 |
| Oxidized | 3.0 |

EXAMPLE NO. 10

Tantalum wire of about 0.11-mm diameter was oxidized by passing through a tube furnace at 65 ft./min. The temperature in tube furnace was maintained at 825° C. and its atmosphere was as in Example 1. The wire-powder bond strength was measured by embedding the wire into tantalum powder, pressing the powder into anodes of 5.5 gm/cc density, sintering anodes for 20 minutes at 1300° C. and measuring the force required to pull the wire out of sintered anodes. The bond strength increased by about 70%.

| Condition | Bond strength |
| --- | --- |
| As-produced | 0.5 |
| Oxidized | 0.85 |

EXAMPLE NO. 11

Tantalum wire of about 0.19-mm diameter wire was oxidized by passing through a tube furnace at 65 ft./min. The temperature in the tube furnace was maintained at 825° C. and its atmosphere was as in Example 1. The wire-powder bond strength was measured by embedding the wire into tantalum powder, pressing the powder in o anodes of 5.5 gm/cc density, sintering anodes for 20 minutes at 1300° C. and measuring the force required to pull the wire out of sintered anodes. The bond strength increased by about 40%. Sintered pellets were formed into anodes at 30 volts and the electrical leakage was measured at 21 volts. Leakage was not degraded in the anodes with oxidized wires compared to those with as-produced wires.

| Condition | Bond strength | Leakage in Nano-Amps/Micro-Farads |
| --- | --- | --- |
| As-produced | 1 | 1.02 |
| Oxidized | 1.4 | 0.775 |

Other variants of the invention could be practiced and other demonstrations of its efficacy could be made, including for example the following.

An annealed tantalum coupon on 0.030"×2"×2" might be heated at 700° F. in oxygen atmosphere for two minutes. Its color would be purple-gold. A 0.015" thick layer of tantalum powder would be spread on it and the assembly of coupon and powder would be heated in vacuum at 1,300° C. for about 30 minutes.

For comparison, another coupon of 0.030"×2"×2" could be processed in as-annealed condition. A 0.15" thick layer of tantalum powder would be spread on it and the assembly of coupon and powder heated in vacuum at 1,300° C. for about 30 minutes.

It is reasonably expected based on the above examples that the bond strength of powder to coupon would be 20–40% higher in the assembly with the first (oxidized) coupon.

The present invention thus provides a method of producing capacitor anodes of refractory metals with bonded refractory metal lead wires (and resultant anode/wire assemblies and capacitors incorporating the same) using wires with surfaces of enhanced of oxygen content limited to a thin wire surface zone. Such enhancement provides a significant reduction of electrical leakage and can increase the production yields of high quality capacitors.

The oxidation surface enhancement can be replaced or supplemented with other means to reduce wire surface melting point and/or increase wire surface vapor pressure, yet preserve intrinsic properties of the powder and wire bulk.

Figure 3:
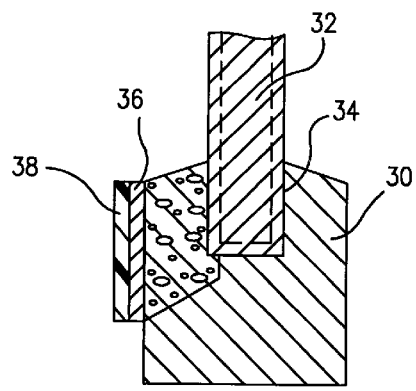
FIGS. 3–6 are sketch form representations of bonded products made according to preferred embodiments of the invention.
Figure 4:
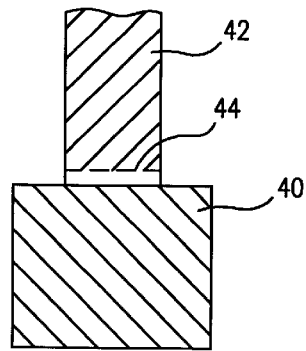

FIGS. 3–6 illustrate several applications of the present invention. FIG. 3 presents a capacitor anode powder mass 30 with an embedded lead wire 32 having a modified surface section 34 as described herein. When the powder is sintered bonding of the wire to the mass is also effected. The figure also shows a portion of the usual cathode layer 36 which is extended by a dielectric impregnated (as manganese nitrate) and converted (to manganese dioxide) throughout the porous anode. The figure also shows a portion of the usual outer insulation coating 38. FIG. 4 shows a similar anode 40 (which is pre-sintered) with a lead wire 42 with modified surface region 44 welded to the anode.

Figure 5:
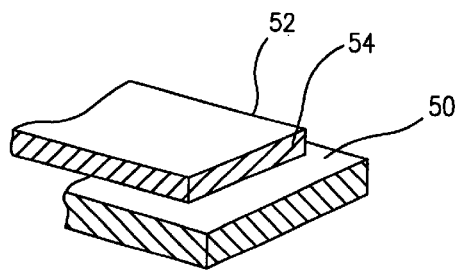

FIG. 5 is a variant of FIG. 4 providing a slab form anode 50, with a lead ribbon 52 (and modified surface layer 54) bonded thereto.

Figure 6:
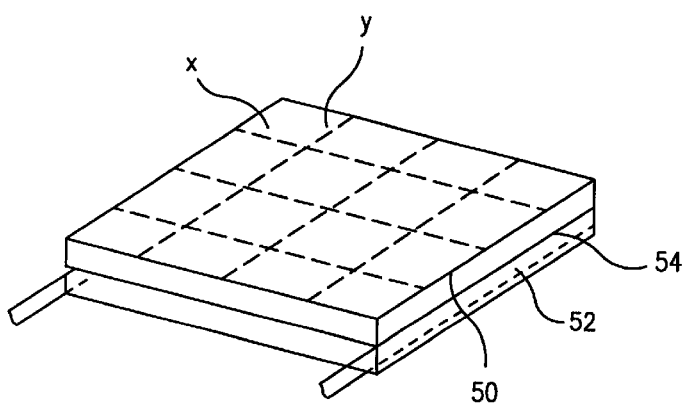

FIG. 6 illustrates a thin powder layer 50 (the powder particles being very coarse—e.g. about 44 microns average diameter) on a lead slab 52 with a modified surface 54. The layers can be bonded and then diced along lines indicated as x, y to form dice (chips) useful as capacitors or resistors in miniature circuits and capable of integration with other passive and active electrical components and circuitry according to well known techniques of the electronic arts. Preferred materials for the slab and/or powder are Ta, Nb. After the bonded assembly is made, additional (finer) powder can be deposited on the coarse powder layer and sintered to it, before or after dicing.

Variants of FIG. 6 can also utilize masking, release agents, and selective variations of powder coating (by way of powder depth and powder species).

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. An assembly of a porous powder compact bonded with a lead wire, the powder and lead wire being made of refractory metals, the wire having a contained oxygen profile with a peak essentially at within 20 nanometers of the wire surface.

2. The assembly of claim 1 wherein the powder and the wire are each selected from the group consisting of tantalum, niobium, alloys of the same with each other and/or with other elements and composites with the foregoing as matrix and laminates including any of the foregoing, the oxygen level of the powder is in the 500–20,000 PPM range and the peak oxygen level at the wire surface is at least being 20% higher than the bulk oxygen level with a roll-off from such peak to at least below 50% of the difference between peak and bulk level within 100 nanometers from the wire surface.

3. The assembly of any of claims 1–2 wherein the wire has a thermally oxidized surface producing such peak.

4. The assembly of any of claims 1–2 wherein the wire has a chemically oxidized surface producing such peak.

5. An assembly of porous powder compact bonded to a lead wire both of refractory metals wherein as made by providing a loose powder mass for the compact, providing a wire, treating the surface of the wire to promote chemically enhanced sintering, placing it in the powder mass and sintering to produce the bonded wire-compact assembly.

6. Refractory metal product as set forth in any of claims 1 or 5 wherein the product is in wire or rod form.

7. Refractory metal product as set forth in any of claims 1 or 5 wherein the product is in sheet or plate form.

8. Refractory metal product as set forth in any of claims 1, or 5 wherein the product is in tube or pipe form.

* * * * *